May 27, 1930. W. W. SCHWARTING 1,760,376
OIL BASE INSULATING PAN FOR INTERNAL COMBUSTION ENGINES
Filed Feb. 17, 1928
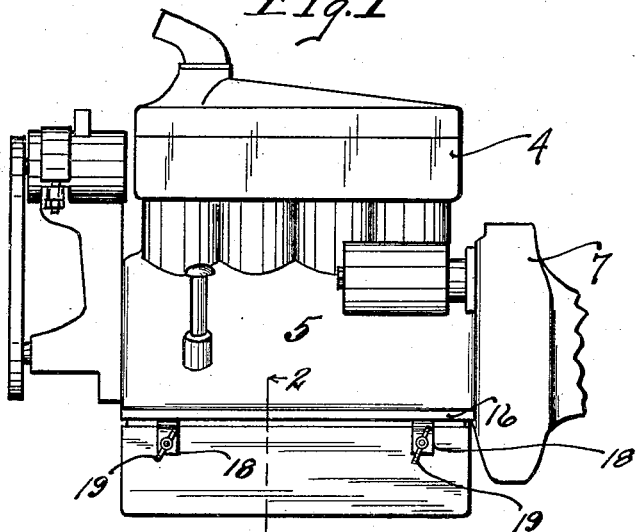
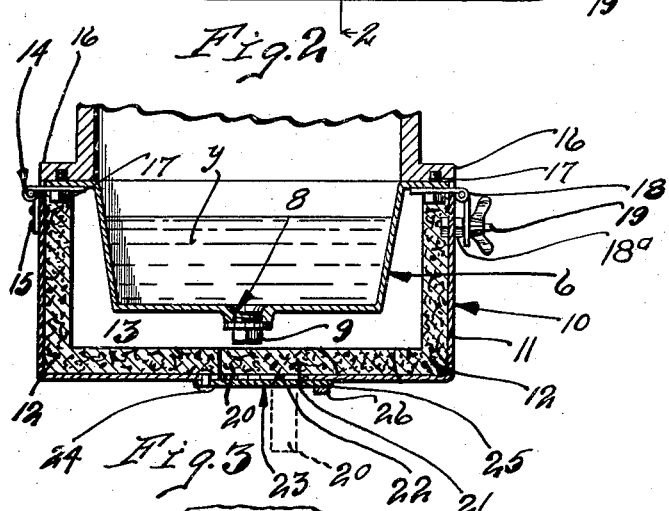
Inventor
Walter Wm. Schwarting
By his Attorneys Patented May 27, 1930

1,760,376

UNITED STATES PATENT OFFICE

WALTER WILLIAM SCHWARTING, OF MINNEAPOLIS, MINNESOTA; GRACE COOK SCHWARTING OWNER BY DECREE OF DISTRIBUTION OF ESTATE OF SAID WALTER WILLIAM SCHWARTING, DECEASED

OIL-BASE INSULATING PAN FOR INTERNAL-COMBUSTION ENGINES

Application filed February 17, 1928. Serial No. 255,069.

My present invention relates to an oil base insulating pan for internal combustion engines, and has for its main object to provide an extremely simple and highly efficient means for retaining, within the oil base, the heat created by the operation of the motor, to maintain the lubricating oil in fluid condition for long periods of time while the motor is exposed to low temperatures, especially when idle, to facilitate starting and insure proper lubrication.

This invention is illustrated in the accompanying drawings, wherein like characters indicate like parts throughout the several views.

Referring to the drawings:

Fig. 1 is a side elevation of an internal combustion engine, showing my improved oil-base-insulating pan attached thereto;

Fig. 2 is a section taken on the line 2—2 of Fig. 1; and

Fig. 3 is a fragmentary bottom plan view of the device.

Of the parts of the engine shown in Figs. 1 and 2, it is only desirable to particularly note the cylinder block 4, crank case 5, oil base 6, fly wheel case 7, and crank case drain port 8 closed by a plug 9. The character $y$ indicates the lubricating oil contained within the oil base or container 6.

The insulating pan is indicated as an entirety by the numeral 10 and comprises a metallic shell 11 lined with heat-insulating material 12. The insulating pan 10 surrounds the sides and bottom of the oil base 6 and is spaced therefrom at its inside to provide a dead air chamber 13, which, together with the insulating material 12, forms a very efficient heat container. At one side, the insulating pan 10 is provided with a pair of hinges 14, the lower wings of which are secured thereto by means of rivets or the like 15, and the upper wings of which are secured to a crank case flange 16 by means of oil-base-securing bolts 17. For securing the other side of the insulating pan to the crank case flange 16, I provide hasps 18 that are very similar in form to the hinges 14. The upper wings of the hasps 18 are secured to the crank case flange 16 by certain of the crank case bolts 17, and the lower wings of the hasps 18 are detachably secured to the shell 11 of the insulating pan 10 by outwardly projecting thumb-nut-equipped bolts 19. The bolts 19, as shown, are secured to the shell 11 by nuts 18ᵃ.

The heat-insulating material 12 is pliable and, hence, when the pan 10 is forced into place, said material will form around the oil-base-securing bolts 17 and form a tight seal against the outturned flanges of the oil base 6.

Directly below the drain plug 9, a portion of the insulating material is incompletely cut to form a semi-circular flap 20 having a lip portion 21, best shown by dotted lines in Fig. 3, and the shell 11 is completely cut away below the flap to form an opening 22 that is normally covered by a plate 23 that is eccentrically pivoted to said shell by a rivet or the like 24. At its end opposite the pivot point, the plate 23 is formed with an outwardly projecting tongue 25. The tongue 25 is normally slid under a depressed catch 26 on the under side of the shell 11 to hold the plate 23 against accidental movements.

When it is desired to remove the drain plug 9 to drain the old lubricant, the plate 23 will be turned pivotally out of alignment with the opening 22 and the flap 20 will be turned downward through said opening, as best shown by dotted lines in Fig. 2. When the drain plug 9 is so located that means for getting access thereto through the heating pan 10 is not possible or at least not practical, or when it is desired, for any reason, to get access to any part of the oil base 6, the thumb nuts may be removed from the bolts 19, the lower wings of the hasps 18 turned outward to disengage the bolts 19, and the entire pan may be dropped pivotally on the hinges 14.

It is well known to all those who drive motor vehicles in winter weather in cold climates, that a large percentage of motor troubles is due to improper lubrication caused by congealing of the oil in the oil base, while the motor is not in operation. With my novel insulating pan, engines may be left inoperative for long periods of time without danger of the oil contained within its oil base congealing to a point where it will endanger proper lubrication of the motor when started and will also cause the motor to start much easier than if the oil were given a chance to congeal.

In actual practice, the device has been found highly practical as a heat-insulator for the oil base, and it has also been found that motors so equipped run much more quiet, due to the fact that noises caused within the lower part of the motor are greatly muffled.

What I claim is:

1. The combination with an internal combustion engine having an oil base, of a closed insulating pan surrounding the sides and bottom of said oil base but spaced therefrom to afford a dead air chamber therebetween.

2. The combination with an internal combustion engine having an oil base, of a closed insulating pan surrounding the exposed surfaces of said oil base, comprising a shell lined with heat-insulating material spaced from the oil base to afford a dead air space therebetween.

3. The combination with an internal combustion engine having a crank case, an oil base and oil-base-securing bolts for detachably securing said oil base to said crank case, of an insulating pan surrounding the exposed surfaces of said oil base and spaced therefrom to afford a dead air chamber therebetween, a hinge on one side of said oil base and having its lower wing secured thereto and having its upper wing secured to said crank case by one of said oil-base-securing bolts, and a hasp on the other side of said insulating pan and having its upper wing secured to the crank case by means of one of the oil-base-securing bolts and having its lower wing detachably secured to the insulating pan.

4. The combination with an internal combustion engine having an oil base, of an insulating pan surrounding the exposed surfaces of the oil base, and an attaching member on each side of the insulating pan for securing the same in respect to the oil base, one of said attaching members having a hinge joint and the other thereof being operable to release the insulating pan in respect to the oil base for hinge-like movement with the other of said attaching members.

In testimony whereof I affix my signature.

WALTER WILLIAM SCHWARTING.